June 30, 1964   G. H. HOWING   3,139,194
WORK TRANSFER MECHANISM
Filed March 9, 1961   2 Sheets-Sheet 1

INVENTOR.
GEORGE H. HOWING
BY
Richard W. Treverton
ATTORNEY

June 30, 1964   G. H. HOWING   3,139,194
WORK TRANSFER MECHANISM
Filed March 9, 1961   2 Sheets-Sheet 2

United States Patent Office 3,139,194
Patented June 30, 1964

3,139,194
WORK TRANSFER MECHANISM
George H. Howing, Rochester, N.Y., assignor to The Gleason Works, Rochester, N.Y., a corporation of New York
Filed Mar. 9, 1961, Ser. No. 94,529
5 Claims. (Cl. 214—1)

The present invention relates to an improved work transfer mechanism adapted especially but not exclusively for delivering gear blanks to the work spindle of a gear cutting machine and removing cut gears from the spindle.

A mechanism according to one aspect of the invention comprises a support, a member rotatable on the support and also reciprocable axially thereon between front and rear limit positions, cooperating guide means on the support and member which slidingly engage as the member moves rearwardly to hold the latter against rotation, said guide means being arranged to hold the member in any one of a number of equi-angularly spaced positions about its rotation axis, a pitman arranged for pivotal connection to said member on any one of an equal number of pivot axes equi-angularly arranged in a circle about said rotation axis, such pivotal connection being established as the member is moved forwardly and broken as the member is moved rearwardly, and power-operated means for reciprocating said pitman and said member, with the strokes of one alternating with those of the other, whereby the member is rotatably advanced on each forward stroke of the pitman and is free of the latter during each return stroke thereof.

According to another aspect of the invention the mechanism comprises a pair of jaws movable on a jaw supporting member, a separate fluid-pressure operated member for moving each jaw relative to said member, and a spring arranged between each jaw and said member for deflection by and during only the terminal portion of the closing movement of the jaw.

Figure 1:
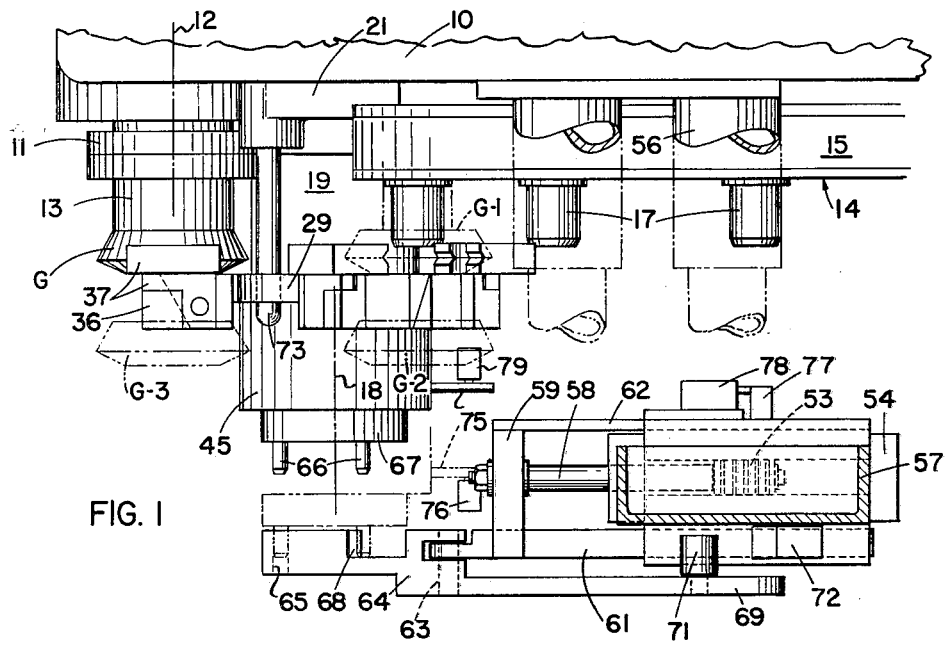
Figure 2:
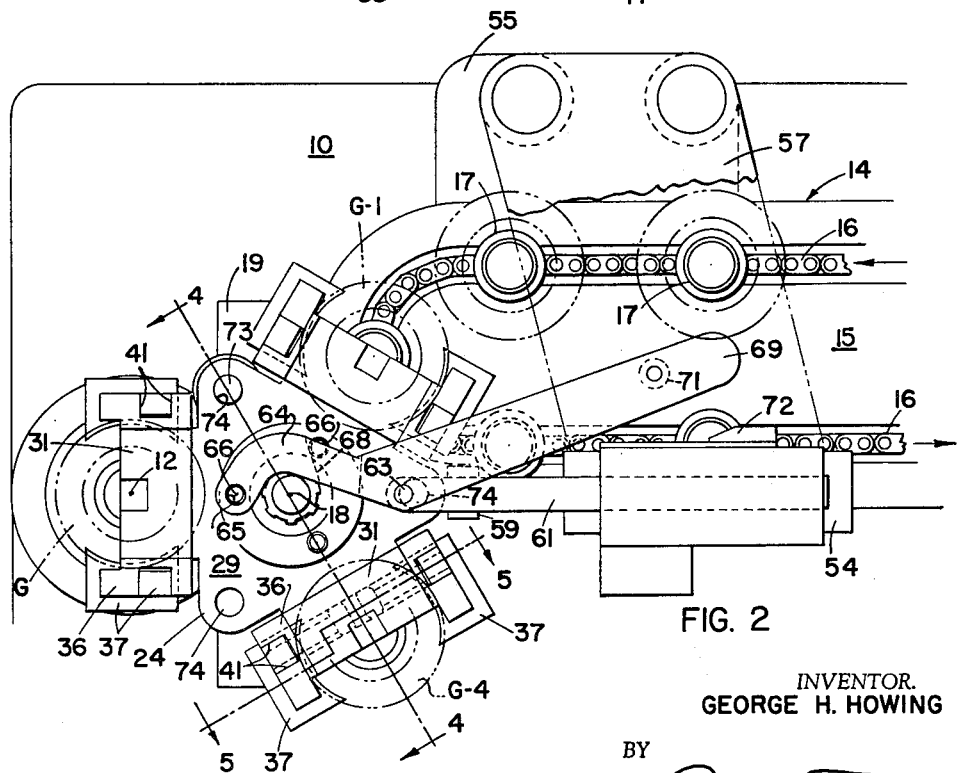
Figure 3:
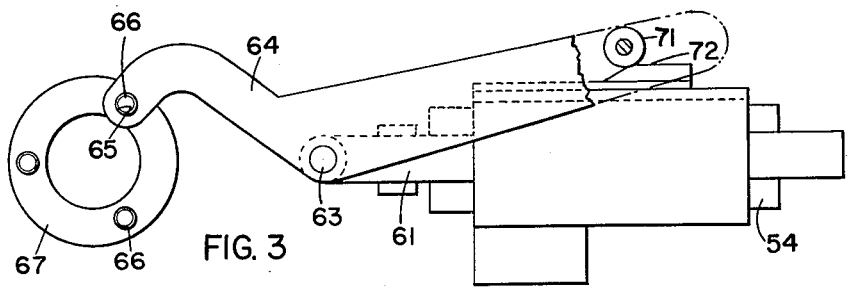
Figure 4:
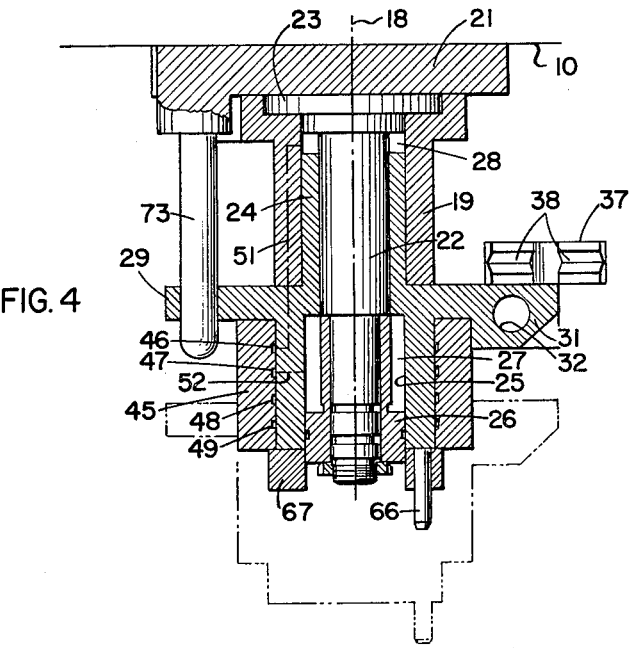
Figure 5:
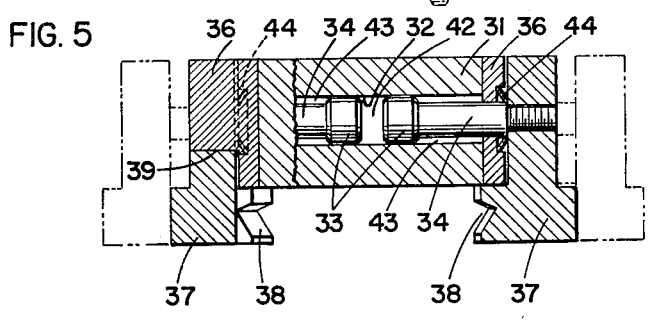

In the preferred embodiment of the invention shown in the accompanying drawings:

FIGS. 1 and 2 are respectively plan and front views of the work transfer mechanism;

FIG. 3 is a fragmentary front view, partly in section, showing the parts in a different position than in FIG. 1; and, FIGS. 4 and 5 are sections respectively in planes 4—4 and 5—5 of FIG. 2.

Referring to FIGS. 1 and 2, the gear cutting machine includes a work head 10 in which a work spindle 11 is journaled for rotation about axis 12. Mounted on the spindle is an hydraulically actuated chuck 13 for a workpiece G which in this instance is a tubular-shank bevel gear blank. A conveyor 14 adjacent the work head delivers workpieces to the position of that shown in broken lines at G–1 in FIGS. 1 and 2. The conveyor may comprise a housing 15 containing an endless chain 16 of which spaced links carry cylindrical holders 17 onto which the blanks may be loaded at a remote point, and, by a succession of advances of the chain, effected by a hydraulic actuator, not shown, carried to the position G–1. By the work transfer mechanism of the present invention a blank at G–1 is (a) moved axially forward to position G–2, FIG. 1, then (b) swung about axis 18 to position G–3, and then (c) moved axially rearwards to cutting position G wherein its shank is received in chuck 13. Simultaneously with these three steps a gear at G, whose teeth have been cut, is (a) moved axially forward to position G–3, then (b) swung to position G–4, and then (c) moved axially rearwards to a position from which it is allowed to drop into a suitable discharge chute, not shown.

The work head 10 constitutes the support for the work transfer mechanism which includes a cylinder 19 (see also FIG. 4) secured to a plate 21 that is rigidly mounted on the work head, the cylinder axis being 18. Coaxial in the cylinder is a rod 22 having a flange 23 clamped between the cylinder and plate 21. A turret 24 is rotatable and axially slidable in the bore of the cylinder and on rod 22. Its forward portion has a cylindrical bore 25 slidably receiving a head 26 that is secured on rod 22. By application of hydraulic pressure to chamber 27, in bore 25 between the turret and the head 26, the turret is moved to and held in its rear position, shown in full lines in FIG. 4; and by application of pressure to chamber 28 in cylinder 19, the turret is moved to and held in its forward position, shown in broken lines in the same view.

The turret 24 has a triangular flange 29, FIGS. 2 and 4, on each side of which there is an enlargement 31 having a cylinder bore 32 containing opposed pistons 33, FIG. 5. The pistons have integral rods 34 which extend slidably through cylinder heads 36 secured to the enlargement 31 and are screw-threaded to work-engaging jaws 37. The cylinder heads related to each pair of jaws are symmetrical. The jaws have recesses 38 to receive the gear blanks, and are guided by surfaces 39 and 41 of the cylinder heads for rectilinear movement between the closed and opened positions shown respectively in full and broken lines in FIG. 5. Opening is effected by application of hydraulic pressure to chamber 42 of cylinder 32; closing by pressure application to chambers 43. The opening movement is limited by abutment of the pistons with cylinder heads 36, the closing movement by engagement of the jaws 37 with a workpiece. However, as closed limit position is approached, each jaw abuts and compresses a Belleville spring 44 that is seated in a recess in the adjacent head 36. The two springs 44 for each pair of jaws are identical, as are the pistons 33 and the fluid pressures applied to them, so that in the closed position the springs are flexed equally. As a result the closed jaws are in symmetrical relation on the turret 24, 31, and the workpiece held by the jaws is accurately centered.

Hydraulic pressure is applied to the chambers 42 and 43, and also to the central turret cylinder chambers 27 and 28, from a suitable pressure source through flexible conduits, not shown, which are connected to a nonrotating distributor ring 45, FIGS. 1 and 4, which is telescoped over and rotatably receives the front portion of the turret. The ring 45 has inner annular grooves 46, 47, 48 and 49 respectively communicating with the flexible conduits and each also communicating, through fluid passages in the turret, with one or more of the cylinder chambers. That is, grooves 46 and 47 are respectively connected by passages 51 and 52, shown schematically, to chambers 28 and 27. Groove 48 is similarly connected to all chambers 42 and groove 49 to all chambers 43.

For rotatively advancing or indexing the turret, counterclockwise in FIGS. 2 and 3, a hydraulic motor comprising piston 53, FIG. 1, and cylinder 54 is provided, the cylinder being supported by means including a plate 55 secured to work head 10, tubular arms 56, and a plate 57. The rod 58 of piston 53 is connected to a cross-head 59 and, by the latter, also to rods 61 and 62 that are slidable on guide surfaces provided on the cylinder member 54. Pivoted by pin 63 to rod 61 is a pitman 64 having an opening 65 for receiving a pin 66. Three such pins 66, equi-spaced in a circle about axis 18, are carried by and project forwardly from a ring 67 that is secured to the turret and serves as a retainer for hydraulic distributor ring 45. In the forward position of the turret one of pins 66 is engaged in opening 65, and, when at the same time the piston 53 is in its limit position to the left, the pitman is in the dead-center position shown in FIG. 2, wherein axis 18 and the axes of the engaged pin 65 and the pivot pin 63 lie in a common plane. This limit position is determined by abutment of a surface 68 of pitman 64 with the pin 66 clockwise of the engaged pin.

The pitman has an overbalancing arm 69 carrying a rider 71 and biasing the pitman clockwise about pivot 63. When the piston 53 approaches its terminal position to the right, which is limited by its abutment with the right end of the cylinder, the rider 71 rides onto a cam 72 supported by cylinder member 54, as shown in FIG. 3. This brings opening 65 into alignment with the pin 66 that just previously had abutted stop surface 68, so that upon the next forward stroke of the turret this pin will engage in opening 65.

For preventing rotation of the turret when it is disconnected from the pitman, a pin 73 supported on plate 21 is arranged to engage in one of three equi-spaced openings 74 in the flange 29 of turret 24 as the latter moves rearwardly. The pin is of such length that it enters an opening 74 before disengagement of the pin 66 from the opening 65 in the pitman, so that the angular position of the turret is controlled at all times.

The mechanism is in the position shown in FIG. 3, and in full lines in FIG. 4, at the completion of each cutting operation. At this time an automatic stop switch, conventional on gear cutting machines, operates a solenoid valve to release chuck 13, apply pressure to distributor groove 49 and place groove 48 on exhaust, thereby causing the jaws to close and grip the cut gear at G and gear blank at G–1. Another solenoid valve also operates, with a slight time delay, to connect grooves 46 and 47 respectively to pressure and exhaust, to thereby effect advance of the turret, stripping the parts G and G–1 from the chuck 13 and the holder 17. When the turret reaches its forward position a pin 75 on the distributor ring 45 closes a limit switch 76, FIG. 1, thereby actuating a solenoid valve controlling piston 53 to move the latter to the left. This indexes the turret by one-third of a turn to bring the blank that had been at G–1 into alignment with axis 12. At the conclusion of this stroke an abutment 77 on rod 62 closes a limit switch 78 mounted on cylinder 54, to thereby reverse the valve controlling the hydraulic connection to grooves 46 and 47. This results in rearward motion of the turret, inserting the blank in chuck 13, and causing pin 75 to close a switch 79 which reverses the valve controlling grooves 48, 49, and thereby opens the jaws and applies the chuck 13. Opening of the jaws holding the cut gear allows the latter to drop to the discharge chute, and application of the chuck restarts the gear cutting machine and causes the conveyor actuator to advance a fresh blank into the now open jaws at position G–1. The switches 76 and 79 are supported by a bracket carried by the cylinder 54. This bracket, which is omitted from the drawings in the interest of clarity, has an elongated guide slot which engages the pin 75 to hold the distributor ring 45 against rotation while permitting it to move axially with the turret.

Having now described the preferred embodiment of my invention, and its operation, what I claim is:

1. A work transfer mechanism comprising a support, a member rotatable on the support and also reciprocable axially thereon, cooperating guide means on the support and member which slidingly engage, as the member moves axially in one direction, to hold said member against rotation, said guide means being arranged to hold said member in any one of a number of equi-angularly spaced positions about its rotation axis, a pitman arranged for pivotal connection to said member on any one of an equal number of pivot axes arranged equi-angularly in a circle about said rotation axis, such pivotal connection being broken as the member is axially moved in said one direction and established as the member is moved in the opposite direction, and power-operated means for reciprocating said pitman and said member, with the strokes of one alternating with those of the other to effect intermittent rotational advance of said member, the pitman being pivotally connected to the part of said power-operated means which reciprocates it and being in dead-center position relative to said rotation axis at the conclusion of its strokes during which said member is so advanced.

2. A work transfer mechanism comprising a support, a member rotatable on the support and also reciprocable axially thereon, cooperating guide means on the support and member which slidingly engage, as the member moves axially in one direction, to hold said member against rotation, said guide means being arranged to hold said member in any one of a number of equi-angularly spaced positions about its rotation axis, a pitman arranged for pivotal connection to said member on any one of an equal number of pivot axes arranged equi-angularly in a circle about said rotation axis, such pivotal connection being broken as the member is axially moved in said one direction and established as the member is moved in the opposite direction, and power-operated means for reciprocating said pitman and said member, with the strokes of one alternating with those of the other to effect intermittent rotational advance of said member, said pivotal connection comprising a pin on said member engaging in an opening in the pitman, said member having one such pin on each of said pivot axes, and said pitman having a stop for abutment with a pin, other than the one to which it is pivotally connected, at the conclusion of each of its strokes during which said member is rotationally advanced.

3. A work transfer mechanism comprising a support, a member rotatable on the support and also reciprocable axially thereon, cooperating guide means on the support and member which slidingly engage, as the member moves axially in one direction, to hold said member against rotation, said guide means being arranged to hold said member in any one of a number of equi-angularly spaced positions about its rotation axis, a pitman arranged for pivotal connection to said member on any one of an equal number of pivot axes arranged equi-angularly in a circle about said rotation axis, such pivotal connection being broken as the member is axially moved in said one direction and established as the member is moved in the opposite direction, and power-operated means for reciprocating said pitman and said member, with the strokes of one alternating with those of the other to effect intermittent rotational advance of said member, the pitman being pivotally connected to the part of said power-operated means which reciprocates it, and there being a cam on said support engageable by said pitman during each return stroke of the latter, said cam being arranged to position the pitman for connection to said member on one of said pivot axes at the conclusion of its strokes during which said member is held against rotation.

4. A mechanism according to claim 3 in which said pitman is arranged to engage said cam by gravity.

5. A work transfer mechanism comprising a support having a workholder thereon, a member rotatable and also axially reciprocable on the support, about and along an axis spaced radially from said workholder, said member having thereon a plurality of workpiece holding devices spaced by equal angles about said axis and at the same radial spacing from the latter as said workholder, so that upon rotation of the member to align one of said devices with the workholder a workpiece may be carried by the device to or from the workholder by an axial motion of the member respectively rearwardly toward the workholder or forwardly away therefrom, cooperating guide means on the support and member which slidingly engage as the member moves rearwardly, to hold the member against rotation, a pitman having thereon a pivot formation adapted for engagement and disengagement by any of a plurality of mating pivot formations on the member, which are spaced around the latter by the same equal angles as said workholding devices, to respectively establish and break a pivotal connection between the pitman and said member as the latter moves forwardly and rearwardly, and means for reciprocating said pitman and said member in such manner that the strokes of one alternate with those of the other, to cause the member to be rotatively advanced through one of said equal angles on each forward stroke of the pitman and to be free of the pitman during each return stroke of the latter.

References Cited in the file of this patent

UNITED STATES PATENTS

| | | |
|---|---|---|
| 993,290 | Bullard | May 23, 1911 |
| 1,578,232 | Ferris | Mar. 23, 1926 |
| 2,072,826 | Riley | Mar. 2, 1937 |
| 2,560,475 | Rehnberg | July 10, 1951 |
| 2,672,773 | Schofield | Mar. 23, 1954 |
| 2,868,582 | Loisell | Jan. 13, 1959 |
| 2,926,795 | Peras | Mar. 1, 1960 |
| 3,000,516 | Dixon | Sept. 19, 1961 |
| 3,054,513 | Pekrul | Sept. 18, 1962 |